Aug. 8, 1933. D. L. BUTOW 1,921,151
MOUNTING PLATE FOR OUTLET BOXES
Filed May 31, 1930
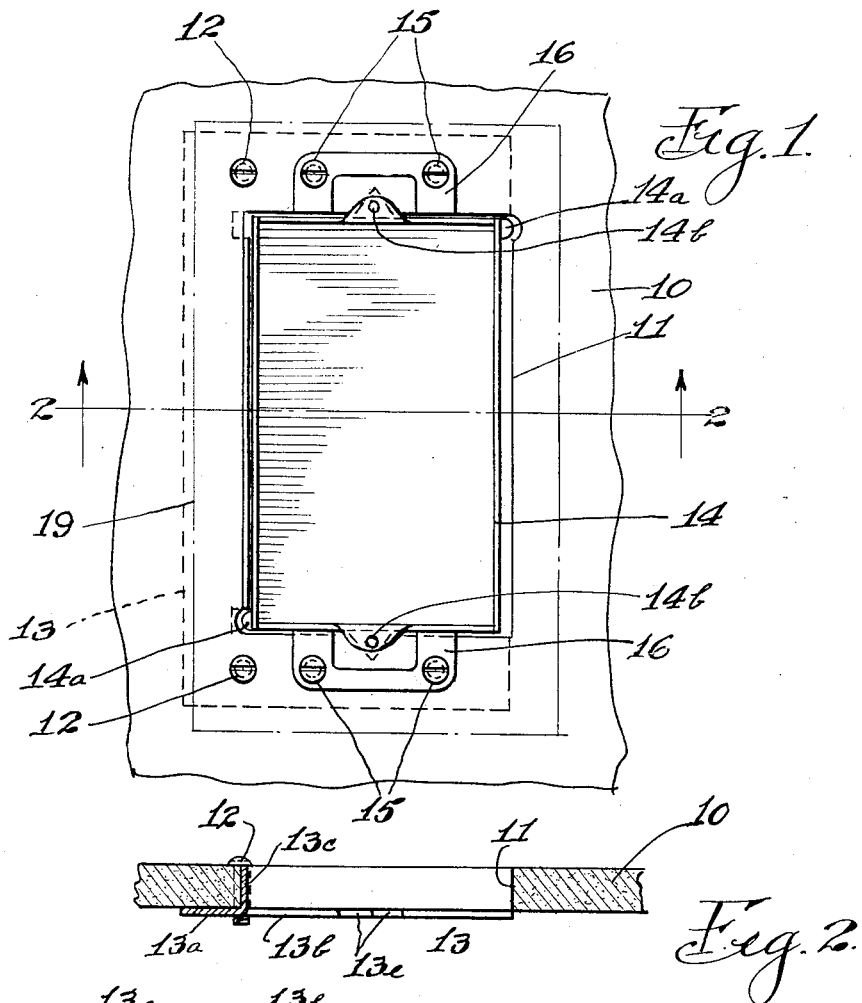
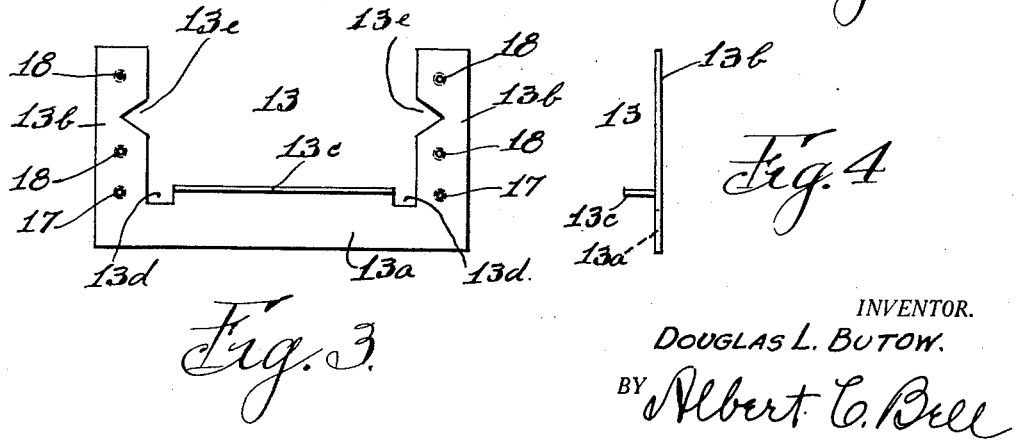
INVENTOR.
DOUGLAS L. BUTOW.
BY Albert C. Bell
ATTORNEY.

Patented Aug. 8, 1933

1,921,151

UNITED STATES PATENT OFFICE 1,921,151

MOUNTING PLATE FOR OUTLET BOXES

Douglas L. Butow, Evanston, Ill.

Application May 31, 1930. Serial No. 458,252

3 Claims. (Cl. 247—21)

My invention relates to an improved construction of mounting plate for outlet boxes of the kind used for electrical work. Where it is necessary to mount outlet boxes and connection boxes in the walls of buildings, particularly where the work is to be done after the building and walls are completed, considerable difficulty has been experienced on account of there being no substantial support to which to secure the boxes. In many cases, wallboard of one kind or another is used in finishing the inside of the walls, instead of plaster, and in such cases where it is necessary to install outlet boxes after the wall is completed, the wallboard affords a poor support to fasten to, in mounting the boxes in openings made in the wallboard to receive them.

By my invention I provide a form of mounting plate which is inserted through the opening in the wall board or other inside finish of the wall, made to receive the outlet box, said mounting plate being provided with a projecting part or parts to locate the mounting plate relatively to the opening, and having threaded holes to receive screws to fasten it in place back of the wall covering. The mounting plate is also provided with threaded holes for receiving the screws employed to hold the outlet box in place, as a result of which when the outlet box is mounted in the opening in the wall, the wall covering is clamped between the mounting plate and a flange or flanges on the outlet box provided to receive the box mounting screws. A further advantage of my mounting plate is that it may be used as a templet for laying out the opening to be made in the wall, and locating the centers of the screw holes to be made through the wall. In this way, there is a certainty that the holes in the wall will register with the holes in the mounting plate, when the latter is mounted back of the inside finish of the wall. It will be understood that my mounting plate is equally effective with walls having any thickness of inside finish, the only difference being that with a relatively thick inside finish like lath and plaster, relatively long screws are employed, while with a relatively thin inside finish like wallboard, relatively short screws are employed.

My invention will best be understood by reference to the accompanying drawing showing a preferred embodiment thereof in which Fig. 1 shows in elevation, a part of a wall with my mounting plate located to support an outlet box in an opening in the wall, Fig. 2 is a sectional view of the parts shown in Fig. 1 taken along the line 2—2 with the outlet box removed, Fig. 3 is a plan view of the mounting plate itself, and Fig. 4 is an end view of the mounting plate shown in Fig. 3.

Similar numerals refer to similar parts throughout the several views.

As shown in Figs. 1 and 2, I illustrate at 10 a part of a wall provided with an opening 11 to receive an outlet box. The wall 10, it will be understood illustrates only the inside finish of a wall of a building whether this finish be wallboard or any other inside finish, that the entire wall may consist of any desired construction required to give stability, and that the inside finish 10 is referred to as the wall, as a matter of convenience. The wall 10 has secured to its inner surface by screws 12, a metal mounting plate 13, which, as indicated in Fig. 1, extends along one side of the opening 11 and across the upper and lower ends of said opening.

As shown in Fig. 1, an outlet box 14 is held in place in the opening 11, by screws 15, 15 which extend through flanges 16, 16 carried by the outlet box 14 and located on the outer surface of the wall 10, said screws 15 extending through the wall 10 and also being threaded into and through the mounting plate 13 in the same manner illustrated for the screws 12 in Fig. 2.

The mounting plate 13 is preferably of such a size and the screws 12 are preferably so located that a cover plate of standard size used as a finish and indicated at 19 in Fig. 1, will cover said screws 12.

As shown in Figs. 3 and 4, the mounting plate 13 consists preferably of a piece of sheet metal having a side member 13a to extend along one side of the opening 11 in the wall, and legs 13b extending from the ends of the side member 13a and at substantially right angles thereto, so that said legs may extend across the two ends of the opening 11. The distance between the inner edges of the legs 13b is preferably the same as the length of the opening 11, and the length of the legs 13b is preferably such that when the mounting plate is in place on the wall, the outer ends of the legs will be in line with one of the side edges of the opening 11. The side member 13a is provided on its inner edge with a flange 13c extending at substantially right angles from the side member 13a, and of a width not greater than the thinnest wall covering used in practice to constitute the inner finish of the walls of buildings. Adjacent the ends of the flange 13c, as shown in Fig. 3, notches 13d are made to clear corner screws used on some types of outlet boxes, illustrated at 14a in Fig. 1. The legs 13b are provided on their inner edges with notches 13e to clear the ends of screws used to fasten in the outlet box 14, any particular device to be mounted therein, for example an electric switch, outlet receptacles, etc., the threaded holes for mounting the device so employed in the outlet box 14, being indicated at 14b in Fig. 1.

As shown in Fig. 3, the mounting plate 13 is provided with threaded holes 17 to receive the screws 12, and other threaded holes 18 to receive the screws 15, these threaded holes being symmetrical about the axis of the outlet box 14 so that the box may be mounted either end up, which is permitted by outlet boxes of standard construction, and so that the mounting plate may be mounted with the side member 13 back of either long side of the opening 11, as circumstance may require.

Since the threaded holes through the two legs 13b of the mounting plate are symmetrical, it will be observed that the outline of the opening 11 may be first marked on the wall, by applying the mounting plate to the outer face of the wall, and that then the mounting plate may be applied to the opening with the flange 13c projecting into the opening and resting against one of the side edges of the opening, to mark the centers of the holes to be made in the wall to receive the screws 12 and 15; then, after the screw holes in the wall are made, the mounting plate is inserted through the opening 11 back of the wall 10, with the flange 13c resting snugly against one of the longer sides of the opening 11, as a result of which the threaded holes in the mounting plate are in registry with the holes made in the wall, the inner edges of the legs 13b being flush with the short sides of the opening 11. With the mounting plate in this position, the screws 12 are inserted to securely hold the mounting plate in place, and then the outlet box 14 is inserted in the opening 11 and held in place by inserting the screws 15 through the wall 10 and through the mounting plate 13. In this manner the outlet box is given a substantial support regardless of the nature of the wall 10.

While I have shown my invention in the particular embodiment above described, it will be understood that I do not limit myself to this exact construction as I may employ equivalents known to the art at the time of the filing of this application without departing from the scope of the appended claims.

What I claim is:

1. Mounting means for outlet boxes, consisting of a flat plate having a body portion and legs extending at right angles therefrom, said body portion having an upturned flange on its inner edge, and said legs having threaded holes symmetrically placed relatively to an outlet box to be enclosed by the body of the leg portions of said plate.

2. Mounting means for outlet boxes, consisting of a flat plate having a body portion and legs extending at right angles therefrom, said body portion having an upturned flange on its inner edge, and said legs having threaded holes symmetrically placed relatively to an outlet box to be enclosed by the body and the leg portions of said plate, certain of said threaded holes receiving screws supporting an outlet box and others of said threaded holes receiving screws supporting said plate.

3. Mounting means for outlet boxes, consisting of a flat plate having a body portion and legs extending at right angles therefrom, said body portion having an upturned flange on its inner edge, and said legs having threaded holes symmetrically placed relatively to an outlet box to be enclosed by the body and the leg portions of said plate, said plate having inner edge notches clearing projections on an outlet box when the latter is moved through said plate.

DOUGLAS L. BUTOW.

CERTIFICATE OF CORRECTION.

Patent No. 1,921,151. August 8, 1933.

DOUGLAS L. BUTOW.

It is hereby certified that error appears in the printed specification of the above numbered patent requiring correction as follows: Page 2, line 95, claim 1, for "of" first occurrence read "and"; and that the said Letters Patent should be read with this correction therein that the same may conform to the record of the case in the Patent Office.

Signed and sealed this 19th day of September, A. D. 1933.

(Seal)

M. J. Moore.
Acting Commissioner of Patents.